P. A. CHRISTIANSON.
TRAILER COUPLING.
APPLICATION FILED APR. 2, 1917.
1,254,984.
Patented Jan. 29, 1918.
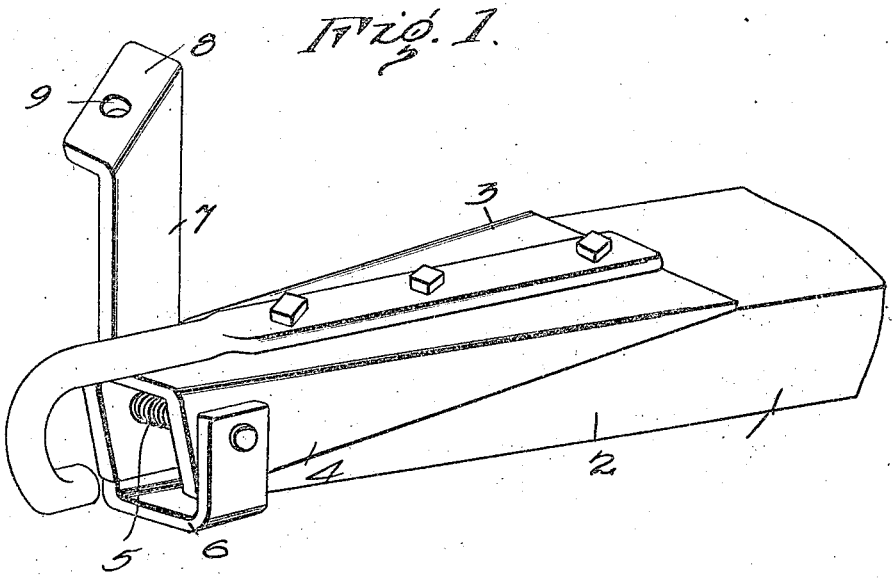
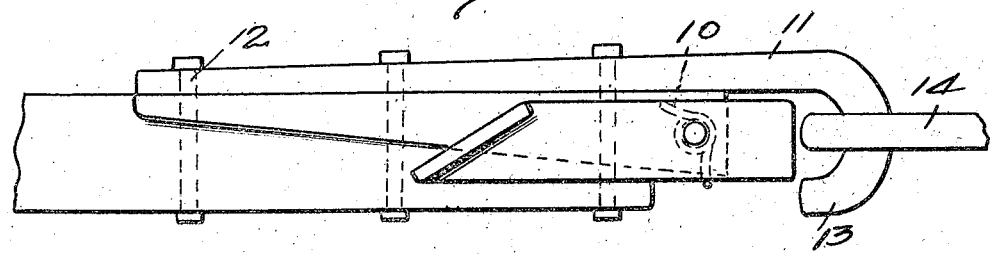
Peter A. Christianson
Inventor
By Geo. P. Kimmel
Attorney

UNITED STATES PATENT OFFICE.

PETER A. CHRISTIANSON, OF ELLENDALE, MINNESOTA.

TRAILER-COUPLING.

1,254,984.  Specification of Letters Patent.  Patented Jan. 29, 1918.

Application filed April 2, 1917. Serial No. 159,243.

*To all whom it may concern:*

Be it known that I, PETER A. CHRISTIANSON, a citizen of the United States, and resident of Ellendale, in the county of Steele and State of Minnesota, have invented certain new and useful Improvements in Trailer-Couplings, of which the following is a specification.

This invention relates to new and useful improvements in couplings, and more particularly to trailer couplings that are adapted to connect a plurality of vehicles, with each other, or with a tractor, for hauling purposes.

Another object of the invention is to provide a trailer coupling of this character which is so constructed, that it is applicable to various types of vehicles now in common use with very little trouble, whereby said vehicles are adapted to be attached to a tractor.

Still another object of the invention is to provide a device of this character, which is easily and simply constructed, inexpensive to manufacture, and one which will be very efficient in operation.

With these and numerous other objects in view, my invention consists of the novel features of construction, combination and arrangement of parts which will be herein-referred to and more particularly pointed out in the specification and claim.

In the accompanying drawing:

Figure 1 is a perspective view of the trailer coupling, showing the same applied to a draft beam, with the latch in open position, and Fig. 2 is a side elevation of the coupler in normal, closed position.

In describing my invention I shall refer to the drawing in which similar reference characters designate like and corresponding parts throughout the several views. The numeral 1 designates a draft beam, such as is ordinarily used on vehicles, for instance various farming implements, that are connected with a tractor at various times.

The end of the draft beam 1 is provided with a tapering extremity 2, and secured to said end of the beam is a plate 3, that is provided with downwardly projecting side portions 4, said plate extending from the end of the beam, and having a pivot pin 5 extending transversely between the downturned portions 4, as clearly shown in Fig. 1 of the drawing. The pin 5 projects laterally from the sides 4 of the plate, and has mounted thereon a substantially U-shaped latch member 6, which has one of its arm portions provided with an extension 7, with a laterally projecting extremity 8, provided with an aperture 9. This extension forms a handle for operating the latch member.

A coiled spring 10 is carried by the pin 5 between the side portions 4, said coiled spring having one end positioned against the top of the plate, while the other end thereof engages one edge of the latch 6, as clearly shown in Fig. 2 of the drawing, to normally hold said latch in closed position, across the end of the beam 1.

A hook member 11 has its shank portion secured to the plate 3, by bolts or rivets 12, that extend therethrough, and through the plate and beam to securely hold these parts in position. The hook portion extends past the end of the plate 3, and is bent downwardly, with its bill 13 extending rearwardly, and disposed in spaced relation from the end of said plate. The hook 11 is adapted to engage a link 14 of a chain that is connected either with the vehicle or the tractor.

The action of the coiled spring 10 will normally hold the U-shaped spring-pressed latch across the open end of the hook 11, that is between the end of the plate 3 and the bill portion of the said hook, as clearly shown in Fig. 2 of the drawing. This will hold the link 14 within the hook, and prevent the same from becoming disengaged therefrom. If desired additional fastening means may be positioned through the aperture 9 in the laterally projecting portion 8 of the handle 7, and wrapped around the end of the beam, to permanently fasten the latch in closed position. To release the coupler, it is only necessary to grasp the handle 7 and swing the same upwardly, whereupon the latch will be moved away from between the end of the plate 3 and the hook, so as to allow the link 14 to be disengaged therefrom.

It is obvious, that if desired the plate and hook may be cast in a single piece, and the same secured on the end of the beam 1. In the type shown in the accompanying drawing the parts are formed separately, but the other construction is applicable. Owing to the extreme simplicity of this device, the same is applicable to various types of draft beams on the conventional type of vehicles or farming implements, with very little labor.

From the foregoing description of the construction and operation of my new and improved trailer coupling, the manner of applying the same to use and the operation thereof will be readily understood, and it will be seen that I have provided a simple and efficient means for carrying out the objects of this invention.

Having fully described my invention, what I claim as new, and desire to secure by Letters Patent, is:

A trailer coupling of the class described including a plate adapted to be secured to one end of a draft beam and projecting therefrom, the projecting portions of said plate having downwardly bent sides, a pivot pin carried thereby, a hook member carried on said plate and projecting from the end thereof, a substantially U-shaped latch mounted on said pin, a coiled spring carried by the pin and engaging the latch to normally hold the base portion of the same between the hook and plate and across the open end of said hook, and an extension on one end of said latch with a laterally bent end to form a handle for operating the said latch.

In testimony whereof I affix my signature hereto.

PETER A. CHRISTIANSON.

Copies of this patent may be obtained for five cents each, by addressing the "Commissioner of Patents, Washington, D. C."